United States Patent
Paffen et al.

(10) Patent No.: US 11,994,853 B2
(45) Date of Patent: May 28, 2024

(54) CONTROL DEVICE FOR REDUNDANT EXECUTION OF AN OPERATING FUNCTION AND MOTOR VEHICLE

(71) Applicant: AUDI AG, Ingolstadt (DE)

(72) Inventors: Matthijs Paffen, Karlskron (DE);
Hans-Georg Gruber, Ingolstadt (DE);
Michael Schmailzl, Kösching (DE);
Jürgen Isenberg, Hilpolstein (DE);
Reinhard Schieber, Egweil (DE);
Jürgen Lerzer, Neumarkt (DE);
Thorsten Zießler, Geisenfeld (DE)

(73) Assignee: AUDI AG, Ingolstadt (DE)

( * ) Notice: Subject to any disclaimer, the term of this patent is extended or adjusted under 35 U.S.C. 154(b) by 1194 days.

(21) Appl. No.: 16/493,611

(22) PCT Filed: Mar. 13, 2018

(86) PCT No.: PCT/EP2018/056235
§ 371 (c)(1),
(2) Date: Oct. 22, 2019

(87) PCT Pub. No.: WO2018/172142
PCT Pub. Date: Sep. 27, 2018

(65) Prior Publication Data
US 2020/0110372 A1 Apr. 9, 2020

(30) Foreign Application Priority Data

Mar. 21, 2017 (DE) .................... 10 2017 204 691.0

(51) Int. Cl.
*B60K 35/00* (2006.01)
*B60R 1/00* (2022.01)
(Continued)

(52) U.S. Cl.
CPC ............... *G05B 9/03* (2013.01); *B60K 35/00* (2013.01); *B60R 1/00* (2013.01); *G06F 13/4022* (2013.01);
(Continued)

(58) Field of Classification Search
None
See application file for complete search history.

(56) References Cited

U.S. PATENT DOCUMENTS 9,934,111 B2  4/2018  Bibelhausen et al.
2011/0054716 A1  3/2011  Stählin et al.
(Continued)

FOREIGN PATENT DOCUMENTS

CN  101710314 A  5/2010
CN  103635884 A  3/2014
(Continued)

OTHER PUBLICATIONS

Dobson, I., "Traffic Flow and Redundancy in Multiprocessor PCIe Backplane Systems," Electronics Information, published Mar. 2009, with attached English-language translation; 10 pages.
(Continued)

*Primary Examiner* — Farley Abad
*Assistant Examiner* — Dayton Lewis-Taylor
(74) *Attorney, Agent, or Firm* — Sterne, Kessler, Goldstein & Fox P.L.L.C.

(57) ABSTRACT

The present disclosure relates to a control device for redundant execution of an operating function, wherein the control device comprises at least a first processor unit and a second processor unit and a plurality of peripheral units and a first switching unit is provided for the first processor unit and a second switching unit is provided for the second processor unit, and wherein the control device is designed in a first operating mode to execute the operating function by means
(Continued)

of the first processor unit and in the meantime to execute a predetermined auxiliary function by means of the second processor unit. According to the invention, the control device is designed, in a second operating mode to execute the operating function by means of the second processor unit, and in so doing to continue to execute the auxiliary function (24) in a predefined reduced scope by means of the second processor unit, wherein a coupling device is provided, which is designed to connect the second processor unit to the first switching unit.

20 Claims, 9 Drawing Sheets

(51) Int. Cl.
*G05B 9/03* (2006.01)
*G06F 11/07* (2006.01)
*G06F 11/16* (2006.01)
*G06F 11/20* (2006.01)
*G06F 13/40* (2006.01)
*G06F 13/42* (2006.01)

(52) U.S. Cl.
CPC ...... *G06F 13/4282* (2013.01); *B60K 2370/11* (2019.05); *B60K 2370/148* (2019.05); *B60K 2370/152* (2019.05); *B60K 2370/157* (2019.05); *B60K 2370/164* (2019.05); *B60R 2300/10* (2013.01); *B60R 2300/20* (2013.01)

(56) References Cited

U.S. PATENT DOCUMENTS

| 2014/0082413 | A1 | 3/2014 | Bilich |
| 2014/0129753 | A1 | 5/2014 | Schuette et al. |
| 2014/0139670 | A1 | 5/2014 | Kesavan et al. |
| 2019/0258251 | A1* | 8/2019 | Ditty ............... G05D 1/0248 |

FOREIGN PATENT DOCUMENTS

| CN | 204347938 U | 5/2015 |
| CN | 105103061 A | 11/2015 |
| DE | 102005037262 A1 | 2/2007 |
| DE | 102011082943 A1 | 3/2013 |
| EP | 2386960 A2 | 11/2011 |
| WO | WO 2014/077908 A1 | 5/2014 |
| WO | WO 2016/087175 A1 | 6/2016 |

OTHER PUBLICATIONS

International Search Report and Written Opinion of the International Searching Authority directed to related International Patent Application No. PCT/EP2018/056235, dated Jun. 22, 2018, with certified English-language translation; 15 pages.

International Preliminary Report on Patentability directed to related International Patent Application No. PCT/EP2018/056235, dated Sep. 24, 2019, with attached English-language translation; 12 pages.

\* cited by examiner

CONTROL DEVICE FOR REDUNDANT EXECUTION OF AN OPERATING FUNCTION AND MOTOR VEHICLE

TECHNICAL FIELD

The present disclosure relates to a control device for redundant provision or execution of an operating function. At least two processor units are provided for executing the operating function. In order to execute the operating function, the processor unit that executes the operating function must be coupled to at least one peripheral unit. This is done by a switching unit (switch distribution circuit). The present disclosure also relates to a motor vehicle comprising the control device according to the present disclosure.

BACKGROUND

From WO 2014/077908 A1, a motor vehicle is known in which a so-called ADAS function (ADAS—Advanced Driver Assistance System) is executed by means of a computer platform as an operating function. In addition, an IVI function (IVI—in-vehicle infotainment) or infotainment function must be executed as an auxiliary function. For this purpose, another computer platform is used. In addition, parts of the ADAS function can also be executed on this other computer platform. However, core elements of the ADAS function must be executed on a specialized SoC (System on a Chip). This has the disadvantage that in case of failure of such a SoC, the ADAS function cannot be provided elsewhere.

From US 2011/0054716 A1 a motor vehicle is known, which in addition to a navigation device has a computing device for providing an ADAS function. Since the ADAS function uses a plurality of sensors, they must be interconnected with the additional computing device. This makes it difficult to relocate the ADAS function to a second computing device, as this also means that the plurality of connections to the sensors at the second computing device must also be provided.

From CN 204347938 U a motor vehicle recording device for capturing video data is known. The data recorder can be coupled via a wireless connection with control units of the motor vehicle.

A driver assistance system (referred to below as ADAS) can automatically carry out at least part of the vehicle guidance (longitudinal guidance and/or transverse guidance) or also the complete vehicle guidance. To provide such an ADAS function, the processing power of a processor unit is necessary. Similarly, the provision of entertainment features or infotainment functions (infotainment information/entertainment) may require processing power, so that a processor unit is also required for this purpose. In addition, in connection with an ADAS function, it is necessary that this is provided redundantly. If the associated processor unit fails or is being serviced to install a software update, the ADAS feature must remain available. Thus, this usually requires a redundant design of the processor unit provided for the ADAS function. All in all, the provision of an ADAS function and an infotainment function results in the need for three processor units, which makes the provision of a corresponding motor vehicle complicated and expensive to manufacture. In a premium-class motor vehicle today, up to 100 processors for the entirety of the functions provided can accordingly be distributed in control units.

However, the problem described does not concern only a motor vehicle. In general, a redundant design of the processor unit required for executing the operating function is provided for the redundant provision of an operating function. If one then wants to provide an auxiliary function, such as the described infotainment function, the hardware complexity increases accordingly.

From a scientific paper by Ian Dobson (Ian Dobson, "Traffic Flow and Redundancy in Multiprocessor PCIe Backplane Systems", Electronics Information, Issue March-2009), a PCI configuration is known in which two redundant processors are networked with peripherals across multiple switches. Here, the switches are also cross-connected.

DETAILED DESCRIPTION

The object of the present disclosure is to provide a resource-efficient solution for the redundant provision of an operating function and the additional provision of an auxiliary function.

The object is achieved by the subjects of the independent claims. Advantageous developments of various embodiments are described by the dependent claims, the subsequent description and the drawings.

In some embodiments, a control device for redundantly providing or executing an operating function is disclosed. An operating function can be designed, by way of non-limiting example, as a program module. So, it is a software feature. The control device has at least a first processor unit and a second processor unit. Furthermore, several peripheral units or support units are provided. An example of a peripheral unit is a connection interface for, for example, a camera. A peripheral unit may include driver hardware for connecting at least one peripheral device or peripheral component. Furthermore, a first switching unit, i.e., distributor circuit or a data switch or a connection matrix, is provided for the first processor unit. For the second processor unit, a second switching unit is accordingly provided, which is different from the first switching unit. Each of the processor units is connected via their respective associated switching unit with some of the peripheral units independent of the respective other switching unit. Thus, the first processor unit can be coupled to one or several of the peripheral units via the first switching unit without the need for the second switching unit for this purpose. Conversely, the second processor unit is coupled via the second switching unit to one or several of the peripheral units without the need for the first switching unit. The control device is then configured to execute said operating function in a first operating mode (a normal mode) by means of the first processor unit, thereby coupling the first processor unit to at least one peripheral unit used by the operating function by means of the first switching unit. By this coupling it is meant that it at least one peripheral unit that can only be reached via the first switching unit, that is not via the second switching unit. The control device is further configured to execute an auxiliary function, i.e., another program module, in the normal mode or first operating mode by means of the second processor unit, thereby coupling the second processor unit to at least one peripheral unit used by the auxiliary function by means of the second switching unit. In the first operating mode, therefore, the first processor unit is provided for the operating function and the second processor unit for the auxiliary function.

In some embodiments, to create redundancy, a third processor unit would actually have to be present to be able to continue the operating function in the event of a failure (defect or maintenance) of the first processor unit. In some embodiments, the control device is instead set up to execute the operating function in a second operating mode (by way of non-limiting example, a maintenance mode) by means of the second processor unit while stopping the auxiliary function or to continue to execute the auxiliary function at least in a predefined reduced scope (in comparison to the first operating mode) by means of the second processor unit. The operating function and the auxiliary function can therefore be executed together on the second operating unit. For this purpose, the scope or the number of functionalities or features provided by the auxiliary function is reduced or reduced compared to the first operating mode. But now there is the problem that the operating function was previously connected via the first switching unit with at least one peripheral unit. From the second processor unit, the operating function must also be able to reach this at least one peripheral unit. For this purpose, a coupling device is provided, which is set up to connect the second processor unit to the first switching unit. The coupling device is further configured to couple the second processor unit by means of the first switching unit with the at least one peripheral unit used by the operating function. This is in particular the at least one peripheral unit that can only be reached via the first switching unit and not via the second switching unit.

In some embodiments, only two processor units are necessary in order to execute or provide a redundant operating function (for example an ADAS function) and an auxiliary function (for example an infotainment function) in the control device. Redundancy is ensured by the fact that the operating function is changed from the first processor unit to the second processor unit and in this case the auxiliary function is stopped or further executed in a reduced scope. Thus, only two processor units are needed to redundantly provide the operating function. In some embodiments, a processor unit is to be understood as having one or more microprocessors as CPU (central processing unit). In addition, one or more coprocessors, in particular one or more GPUs (graphical processing unit) may be provided. By way of non-limiting example, one or more microcontrollers may be provided in a processor unit. A processor unit can thus represent a so-called compute node, in which a plurality of processors for executing a program module can be interconnected. The peripheral units can also be configured as peripheral nodes with a plurality of driver ICs.

The present disclosure also describes further embodiments, which offer additional advantages.

In some embodiments, a switching unit is understood in particular to be a PCI Express (PCIe; peripheral unit interconnect unit) with an integrated circuit (IC) or several ICs for a PCI Express switch. By way of non-limiting example, a switching unit may also be provided for other data high-speed communication technology standards such as Infini-Band.

In some embodiments, configuration of the coupling device is disclosed. The coupling device can provide that the first switching unit has a connection port which can be operated in an upward mode, via which it is connected by means of a communication line to a switch connection interface of the second processor unit. Another name for upward mode is upstream mode. It's an up-facing mode, pointing the PCIe towards the root complex. A switch port interface represents a downstream port, that is, a port that operates in a downstream or downlink mode directed away from the root complex. In the case of PCIe, the switch port interface (PCIe IF) is also referred to as the "root complex port." A communication line is to be understood as an electrical connection which may comprise one or more wires and/or one or more conductor paths. It may therefore be, for example, multiple conductor paths and/or wires for simultaneous and independent transmission of multiple electrical signals. The first switching unit can thus have a connection port which can be operated in an upwards mode, via which it is interconnected with its own processor unit, which can likewise have a switch connection interface for this purpose. The coupling device now provides that a second connection port which can be operated in the upward mode is additionally provided at the first switching unit and is connected to the switch connection interface of the second processor unit by means of a communication line of this second connection port. Of course, the second processor unit can additionally have a switch connection interface via which it is connected to its own, that is to say the second, switching unit at a connection port of the second switching unit which can be operated in the upward mode. In addition, it can of course be provided that the second switching unit is also interconnected crosswise with the first processor unit in the manner described.

In some embodiments, instead of a direct connection of the first switching unit with the second processor unit, the coupling device provides that the first switching unit and the second switching unit are interconnected directly via a communication line, i.e. bypassing the processor units. Each processor unit then has to be interconnected only with its own switching unit directly via a communication line. In order to transmit data from the first switching unit to the second processor unit, the first switching unit can use the communication line to the second switching unit so that the second switching unit can then forward the data to the second processor unit.

In some embodiments, the switching units are each a PCI Express switching unit. The communication line which connects the two switching units directly to one another is connected to a respective connection port of the respective switching unit and at least one of the connection ports both is configured to be operable in an upstream mode and/or in a downstream mode and also at the same time in a non-transparent bridging mode (NTB mode). As a result, the extended address space resulting from the direct connection for addressing the peripheral units need not be managed by a switching unit alone, but the address spaces of the two switching units remain separate. A connection port operated in upstream mode is also referred to as an upstream port and a connection port operated in downstream mode is also referred to as a downstream port.

For switching the switching units between different operating modes, in some embodiments, predetermined configuration data are set in a respective configuration register of the switching units.

In some embodiments, the first switching unit and the second switching unit are connected directly to each other by means of a communication line. The first processor unit and the second processor unit are exclusively coupled indirectly via this communication line for data exchange. Thus, a single communication line is sufficient to couple both the switching units with each of the processor units and the processor units with each other for data exchange. By way of non-limiting example, it may be provided that the first processor unit and the second processor unit are arranged in different control units of the control device. Then only a single communication line is needed to connect these control units with each other for data exchange.

In some embodiments, in the second operating mode, that is to say while the second processor unit is executing the operating function, provision is made in particular for the control device to keep the first processor unit coupled to a memory unit with at least one data memory by means of the first switching unit. In this case, for example, software or an operating program for the first processor unit can be transferred from the memory unit to the first processor unit and, as a result, the first processor unit can be maintained or provided with an update.

As described herein, in the second operating mode, e.g., in a maintenance mode, the operating function is shifted from its first processor unit originally provided for the normal mode (first operating mode) to the second processor unit. However, it may also be the case that the second processor unit fails or must be serviced. For this purpose, the control device is then preferably configured to continue to execute the operating function by means of the first processor unit in a third operating mode (for example, a further maintenance mode) and to further execute the auxiliary function in the predefined reduced scope by means of the first processor unit. In this case, the coupling device is set up to connect the first processor unit to the second switching unit and to couple the first processor unit to the at least one peripheral unit used by the auxiliary function by means of the second switching unit. In particular, this is at least one peripheral unit that can only be reached via the second switching unit and not via the first switching unit. Thus, the second processor unit, for example, can be made free for a software update or relieved of the auxiliary function.

In some embodiments, a watchdog function or a health monitor is provided. For this purpose, the control device is set up to check availability of the operating function in each operating mode by means of a monitoring function. This monitoring function is the said watchdog function. Thus, a failure or a malfunction of the operating function can be detected.

In some embodiments, the control device can be set up to execute the monitoring function both by means of the first processor unit and by means of the second processor unit. In the second operating mode, the second processor unit can then execute both the operating function itself and the monitoring function. By way of non-limiting example, the monitoring function is performed by means of an additional, third processor unit. This has the advantage that the third processor unit can be operated independently of the other two processor units and as a result the monitoring function can monitor the operating function independently of the state of the two processor units.

With regard to the described peripheral units, they comprise at least one coprocessor unit and/or at least one input/output unit for network data (for example an Internet) and/or for bus data (for example a CAN bus; Controller Area Network) and/or at least one sensor interface for connecting a sensor device (for example, a camera and/or a radar and/or a lidar) and/or at least one audio interface for connecting at least one audio system (for example, audio amplifier and/or loudspeaker and/or a microphone) and/or at least one graphics interface for connecting at least one display device (for example a screen).

As described above, a control device for providing a redundant operating function is disclosed. In particular, the control device may be designed for a motor vehicle. The operating function may be an ADAS function, that is to say a driver assistance function of the motor vehicle. The auxiliary function may be an infotainment function of the motor vehicle, for example, the presentation of Internet data and/or the control of a media playback system (for example, an MP3 display device) and/or the control of a telephone system of the motor vehicle.

In some embodiments, a motor vehicle with an embodiment of the control device as described herein is disclosed. The motor vehicle may be a car, in particular a passenger car or truck.

Exemplary embodiments of the present disclosure are described below with respect to the drawings.

The exemplary embodiments explained below are preferred embodiments that each constitute individual features to be considered independently of one another or in a combination different from that shown. In addition, features other than those already described can be added to the embodiments described.

In the drawings, elements having the same function are each provided with the same reference signs.

Figure 1:
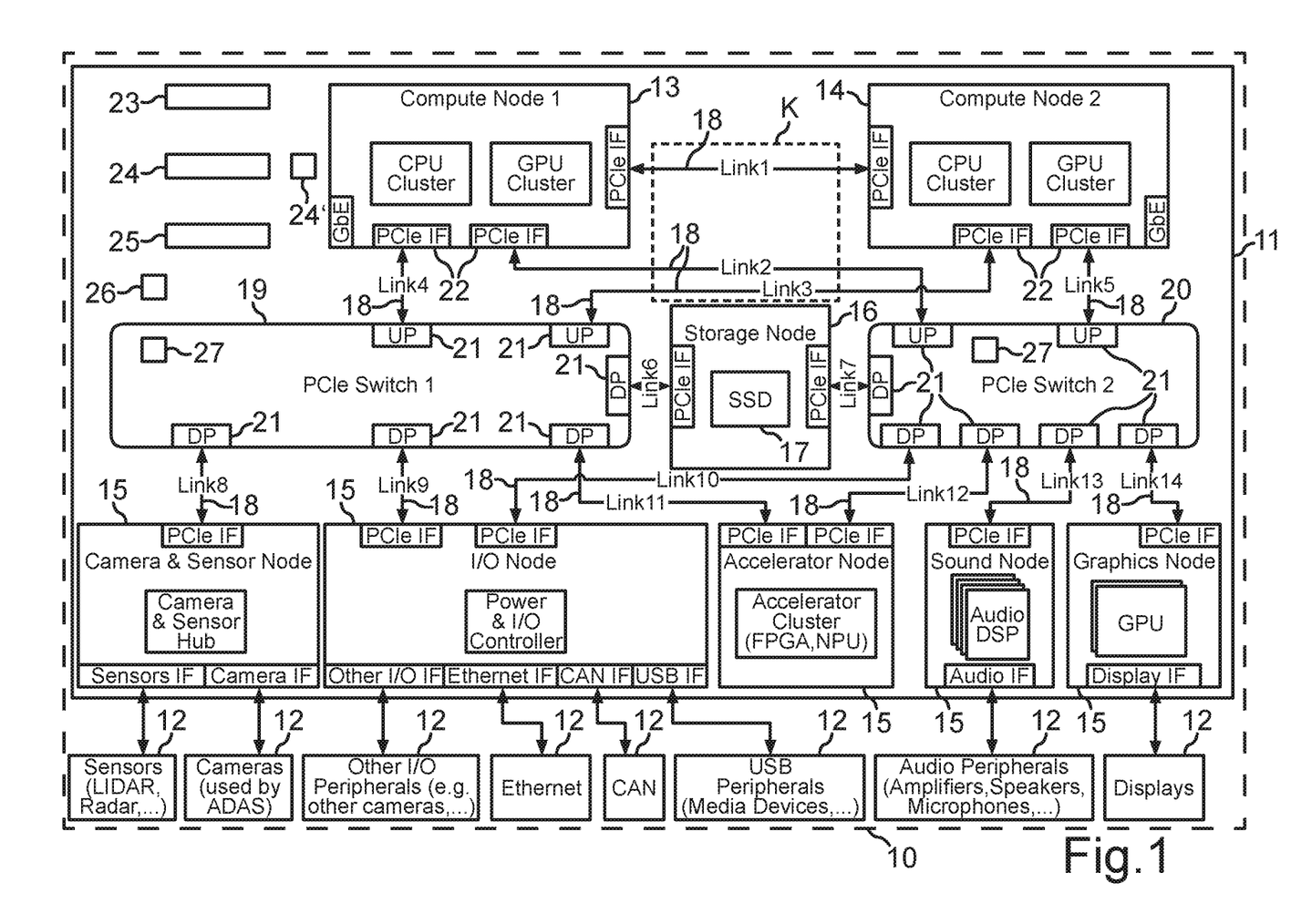
FIG. 1 is a schematic illustration of first embodiment of a motor vehicle, in accordance with some embodiments.

FIG. 1 is a schematic illustration of first embodiment of a motor vehicle, in accordance with some embodiments. FIG. 1 shows a motor vehicle 10, which may be, for example, a motor vehicle, in particular a passenger car or truck.

In the motor vehicle 10, a control device 11 may be coupled to peripherals or peripheral components 12. Examples of the peripheral components 12 are given in FIG. 1. They can be sensors, for example lidar or radar or camera, an Ethernet network, a communication bus, for example a CAN bus, at least one USB peripheral device (USB—Universal Serial Bus), an audio system, for example an amplifier and/or speakers and/or at least one microphone, and/or at least one screen (display).

The control device 11 may be configured, for example, as a single control device for the motor vehicle 10. A further embodiment described in more detail below may provide two control units 11 or more than two control units in the control device 11.

The control device 11 may include a first processor unit 13 and a second processor unit 14, which are designated here by name as compute node 1 and as compute node 2. For coupling the control device 11 to the peripheral components 12, the control device 11 may comprise peripheral nodes or peripheral units 15, in each of which the interface hardware or driver hardware may be provided for connecting the respective peripheral component 12. For example, the processor units 13, 14 and the peripheral units 15 can be arranged on a common printed circuit board (PCB). Electrical and mechanical connections are designated in the figures in each case as an interface IF (interface).

In accordance with some embodiments, the following peripheral units are provided: a peripheral unit for exchanging camera data and sensor data (Camera & Sensor Node), an input-output peripheral unit (I/O node), a coprocessor peripheral unit (Accelerator Node), an audio interface (Sound Node), and a graphics interface (Graphics Node). For example, at least one FPGA (Field Programmable Gate Array) and/or NPU (Neuromorphic Processor) may be provided by the coprocessor unit. The graphics interface may include at least one graphics processor (GPU).

A memory unit 16 with at least one data memory 17, for example an SSD memory (SSD—solid state disk), can be provided.

In order to interconnect the processor units 13, 14 with the peripheral units 15 and the memory unit 16 for data exchange, data lines 18 may be provided between them. The data lines 18 are designated in the figures with the designations Link1 to Link15. Each may be, for example, multiple conductor paths or multiple wires.

So that not every component has to be connected to each other via its own communication line, a first switching unit 19 (switch 1) can be provided for the first processor unit 13 and a second switching unit 20 (switch 2) for the second processor unit 14. In particular, the switching units 19, 20 are configured based on a PCIe technology (PCIe switch). For connecting communication lines 18 to the switching units 19, 20, these may have ports 21 which may be operated in an upstream port (UP) mode or a downstream port (DP) mode.

For connecting the switching units 19, 20 to the processor units 13, 14, these can each have a switch connection interface 22.

For executing program modules, the processor units 13, 14 may each have one or more CPUs (i.e. a CPU cluster) and/or one or more GPUs (i.e. a GPU cluster).

Figure 2:
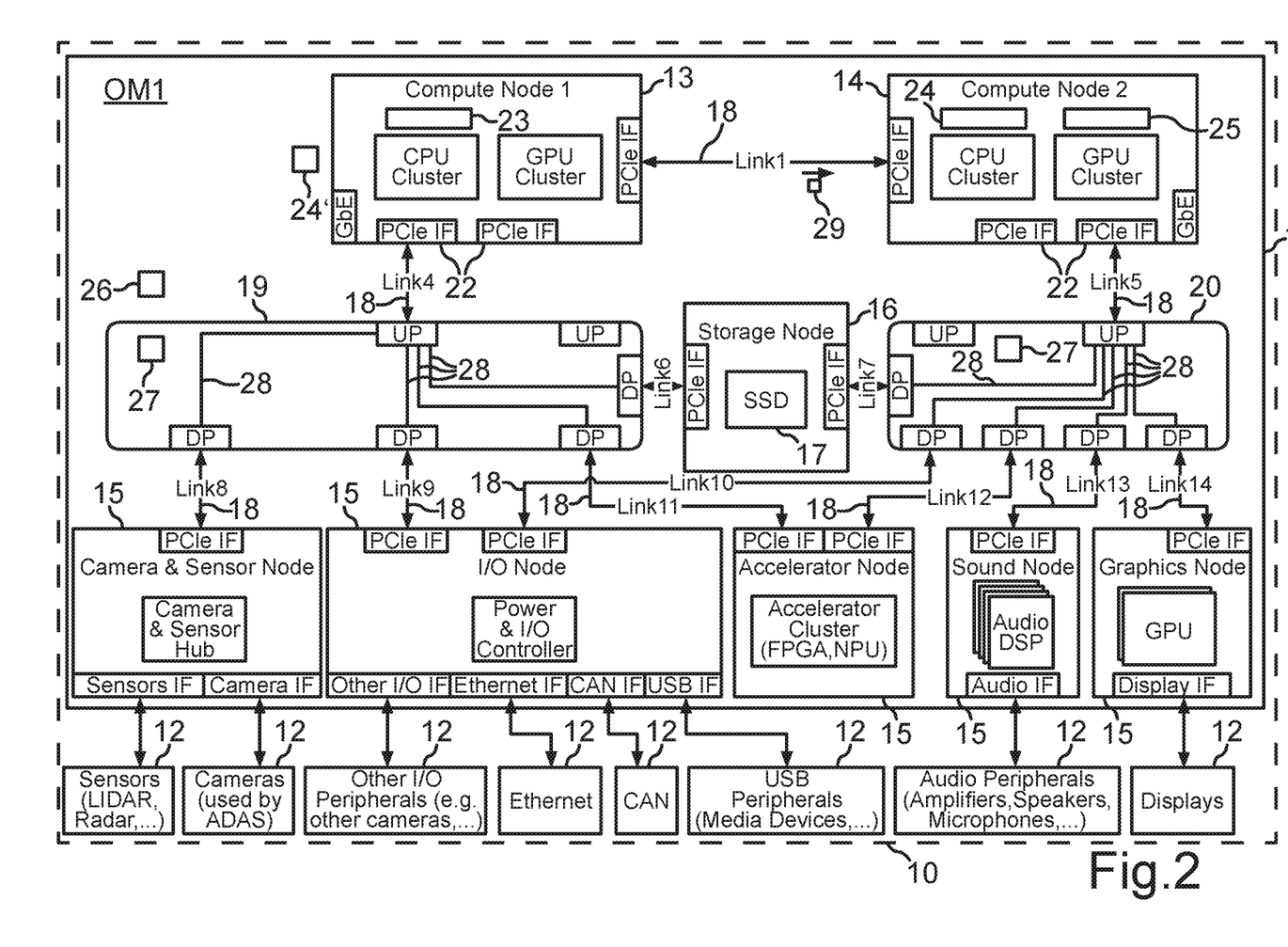
FIG. 2 is a schematic illustration of a control device of the motor vehicle of FIG. 1 in a first operating mode, in accordance with some embodiments.
Figure 3:
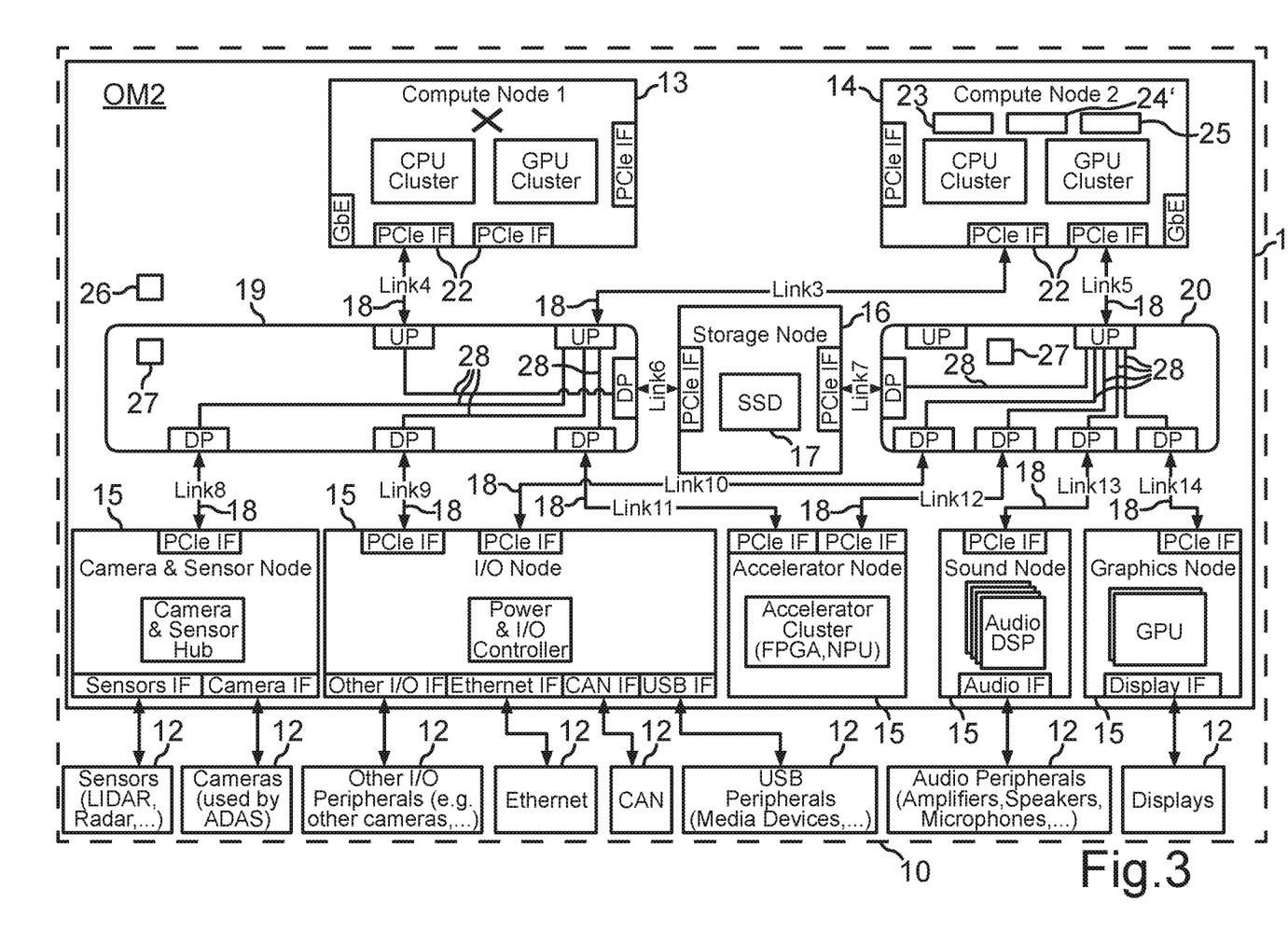
FIG. 3 is a schematic illustration of the control device of FIG. 2 in a second operating mode, in accordance with some embodiments.
Figure 4:
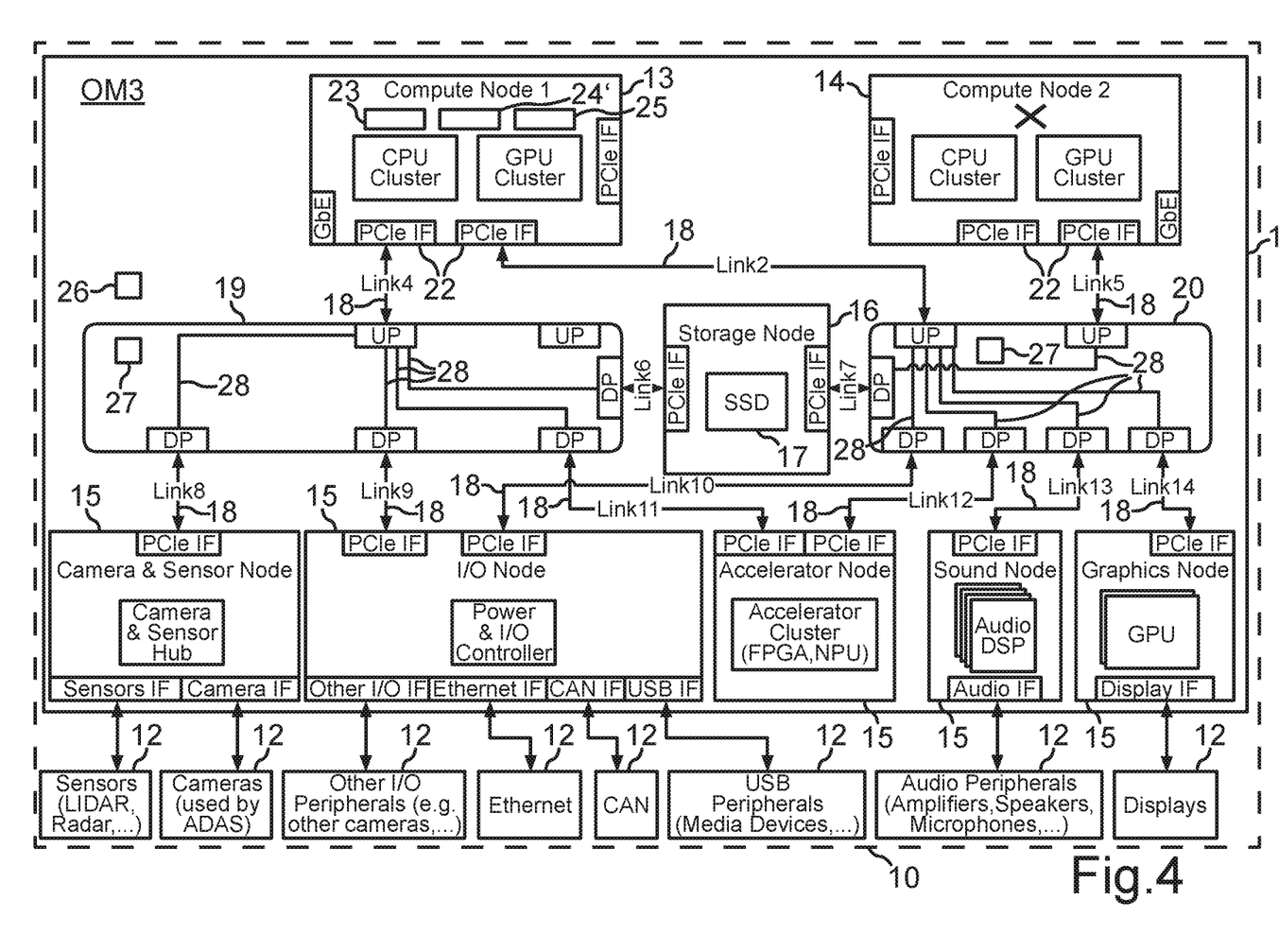
FIG. 4 is a schematic illustration of the control device of FIG. 2 in a third operating mode, in accordance with some embodiments.

With the architecture or arrangement shown in FIG. 1, three different operating modes can be provided, which are further illustrated in FIGS. 2 to 4:

A first operating mode OM1 (normal mode), in which the processor unit 13 completely executes an operating function 23, for example an ADAS function, and processor unit 14 completely executes an auxiliary function 24, for example an IVI function or infotainment function. Furthermore, a monitoring function, for example an ADAS health monitor, can also be executed on the processor unit 14. The first operating mode OM1 is shown in FIG. 2 again in more detail and will be explained again below.

In a second operating mode OM2, a maintenance mode for the processor unit 13, the processor unit 13 is switched off or is restarted because, for example, it has a software error, or a software update has to be executed. Processor unit 14 executes the operating function 23 completely and can additionally execute an auxiliary function 24' which is limited in its functional scope or in its functionality, as well as the monitoring function 25. The second operating mode OM2 is illustrated in FIG. 3 and explained in more detail below.

In a third operating mode OM3, the processor unit 14 is in a maintenance mode. The processor unit 13 completely executes the operating function 23 as well as the limited variant of the auxiliary function 24 and the monitoring function 25. The third operating mode OM3 is illustrated in FIG. 4 and will be explained in more detail.

In order to be able to couple the processor units 13 and 14 in the three operating modes with the peripheral units 15 required or used by the functions 23, 24, 24', 25 that are executed on the respective processor unit, the switching units 19 are configured accordingly on the basis of configuration data, which can be stored for example by a central control unit 26 in a respective configuration register 27 of the switching unit 19. The control of the operating modes OM1, OM2, OM3 and the reconfiguration of the switching units 19 required for this purpose may be carried out, for example, by a control device 26 of a power supply unit and of a communication controller (Power & I/O Controller).

FIG. 2 illustrates once again the first operating mode OM1. For the switching unit 19, it is shown in FIG. 2 which communication paths 28 are set there. Furthermore, the illustrations of Link2 and Link3 are omitted to illustrate that they are not needed and/or are disabled in the first operating mode OM1.

OM1 is the normal mode or normal operating mode of the control device, such as may be taken after a start or boot of the system, wherein the operating function 23 is executed on the processor unit 13 and the auxiliary function 24 on the processor unit 14. In addition, the monitoring function 25 may also be executed on the processor unit 14 to monitor the correct execution of the operating function 23. For this purpose, Link1 can be used to transmit status data 29, that is to say the direct communication line between the two processor units 13, 14. This communication, for example, to visualize ADAS states and decisions to monitor the ADAS functionality for predictive environment monitoring data for roads and objects from a navigation database or communication link (e.g. from an Internet from a data cloud and/or from other vehicles). While the processor unit 13 communicates via the first switching unit 19 with the peripheral units 15 used by the operating function 23, the processor unit 14 communicates via the switching unit 20 with the peripheral units 15 used by the auxiliary function 24. In particular, the processor unit 13 does not communicate with the switching unit 20 and the processor unit 14 does not communicate with the switching unit 19.

In the following it is assumed that the operating function is an ADAS function or ADAS for short and the auxiliary function is an IVI function by way of example.

FIG. 3 illustrates the second operating mode OM2. OM2 is the operating mode in which the processor unit 13 is in maintenance mode. This may be due to a detected error or a detected malfunction or to the maintenance for updating software/firmware on the processor unit 13. Thus, the processor unit 13 is either restarted in a reset or turned off. Thus, the processor unit 13 is connected or coupled exclusively to the memory unit 16 via the first switching unit 19.

The second processor unit 14 takes over the operating function 23. Thus, the operating function 23 is connected in addition to the ADAS peripheral units 15 via the Link3. The auxiliary function 24 on the second processor unit 14 is reduced compared to the normal operation range of functions, which at least allows the visualization of the ADAS states. Other communication, for example, predictive environment data from the navigation database or from the cloud or from other vehicles exchanged between the ADAS and the IVI function, is also performed on the second processor unit 14.

In addition, the monitoring function 25 for the ADAS is also executed on the second processor unit 14 and thus on the same processor unit as the operating function 23 itself. Since the availability or monitoring of the operating function 23 is reduced, it can be provided that it is indicated to the driver of the motor vehicle 10 (for example, via a screen or a display device in the motor vehicle), to be prepared for a possible takeover of the vehicle.

FIG. 4 illustrates the third operating mode. In the third operating mode, the first processor unit 13 is operated normally while the second processor unit 14 is being serviced or restarted. This may be because a faulty behavior of the second processor unit 14 has been detected or because a software/firmware update has to be performed at the second processor unit 13. Thus, the second processor unit 13 is either restarted or turned off. For the third operating mode, the second processor unit 14 is coupled via the second switching unit 20 exclusively to the memory unit 16.

The first processor unit 13 takes over the limited auxiliary function 24' for execution. Thus, the first processor unit 13 for the auxiliary function 24' must be coupled or interconnected with the peripheral units 15 used by the auxiliary function 24' via the Link2.

Through the communication lines Link1, Link2 and Link3, a coupling device K for coupling the processor units 13, 14 to each other and to the cross-coupled processor units 13, 14 with the first switching unit 19 and the second switching unit 20 is provided.

The auxiliary function 24' is configured in the same manner and communicates in the same manner as described in connection with FIG. 3. The monitoring function 25 may also be executed by the first processor unit 19 and thus on the same processor unit 19 as the operating function 23 itself. Since this limits the high availability of the operating function 23, a driver can be notified in the manner already described in connection with FIG. 3.

Figure 5:
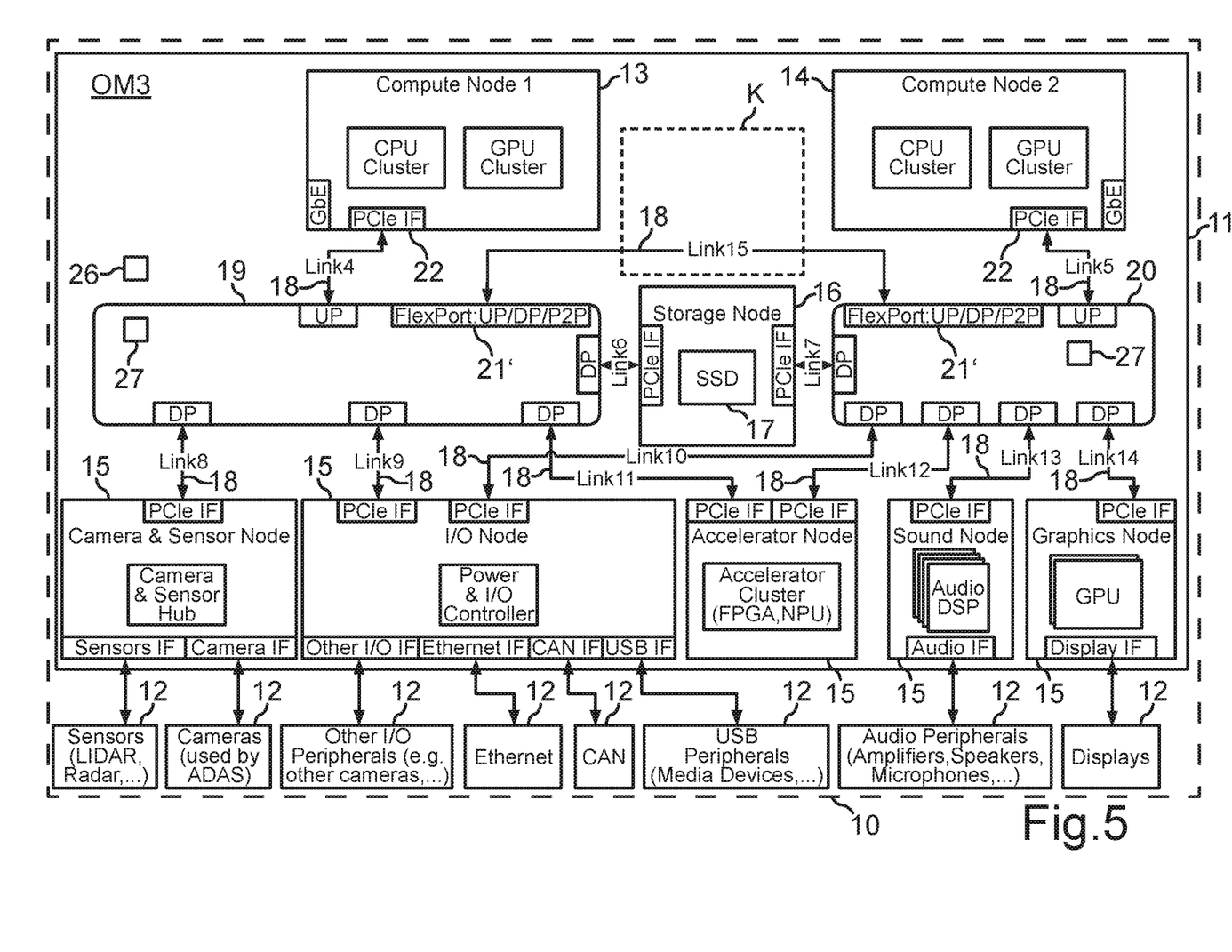
FIG. 5 is a schematic illustration of a second embodiment of the motor vehicle, in accordance with some embodiments.

FIG. 5 shows a motor vehicle 10, in which the coupling device K is further optimized so that a single communication line Link15 is sufficient to connect the processor units 19, 20 to each other and the switching units 19, 20 for a data exchange.

In the three operating modes OM1, OM2, OM3 only one of the communication lines Link1, Link2, Link3 is used or is active. Therefore, a single communication line can now be provided with Link15 which can be used differently in each of the three operating modes OM1, OM2, OM3. As PCI switch ports, switchable ports 21' are provided for this purpose in connection with the execution of the switching units 19, 20, which are referred to here as flex ports and can be reconfigured to perform both the function of an upstream port (upstream mode) and a downstream port (downstream mode) and a P2P port (point-2-point mode). The P2P mode can be realized by activating or setting an NTB (Non-Transparent-Bridge) mode on the respective port 21' operated as a downstream port and/or an NTB function is coupled with the respective upstream ports of the switching units 19, 20.

Figure 9:
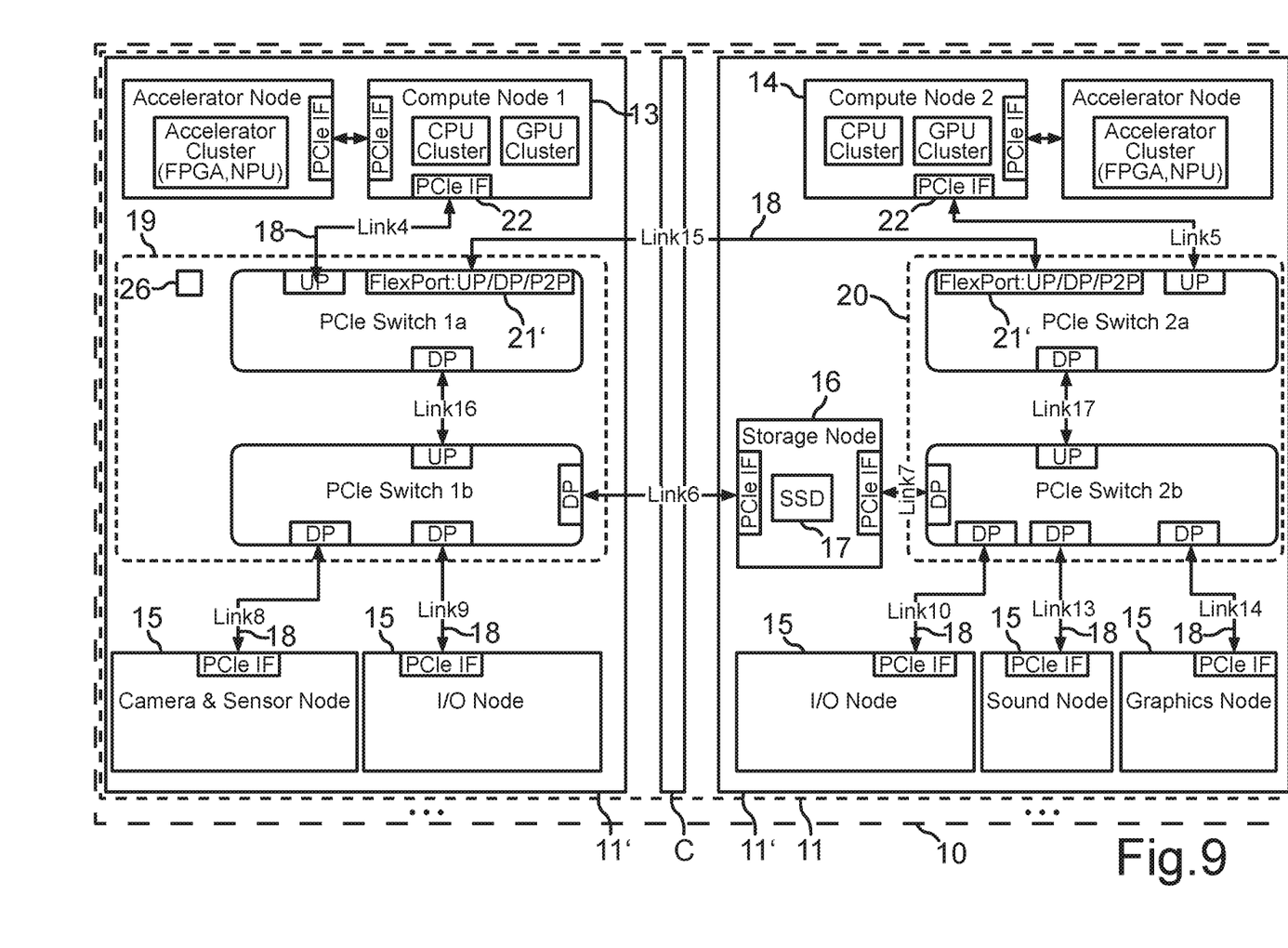
FIG. 9 is a schematic illustration of a third embodiment of the motor vehicle, in accordance with some embodiments.

This further reduction of the coupling device K to a single physical Link15 (communication line) between the switching units 19, 20 reduces the number of communication lines of the coupling device K from 3 to 1, which is particularly advantageous when the first processor unit 13 and the second processor unit 14 are located in different control units 11', which is illustrated in FIG. 9. FIG. 9 shows the control device 11 with two control units 11', which are connected via a PCIe cable C, through which the Link15 and the Link6 can be formed. A further provision of communication lines between the control units 11' is not necessary then.

As a result, deployment costs and weight can be saved.

Figure 6:
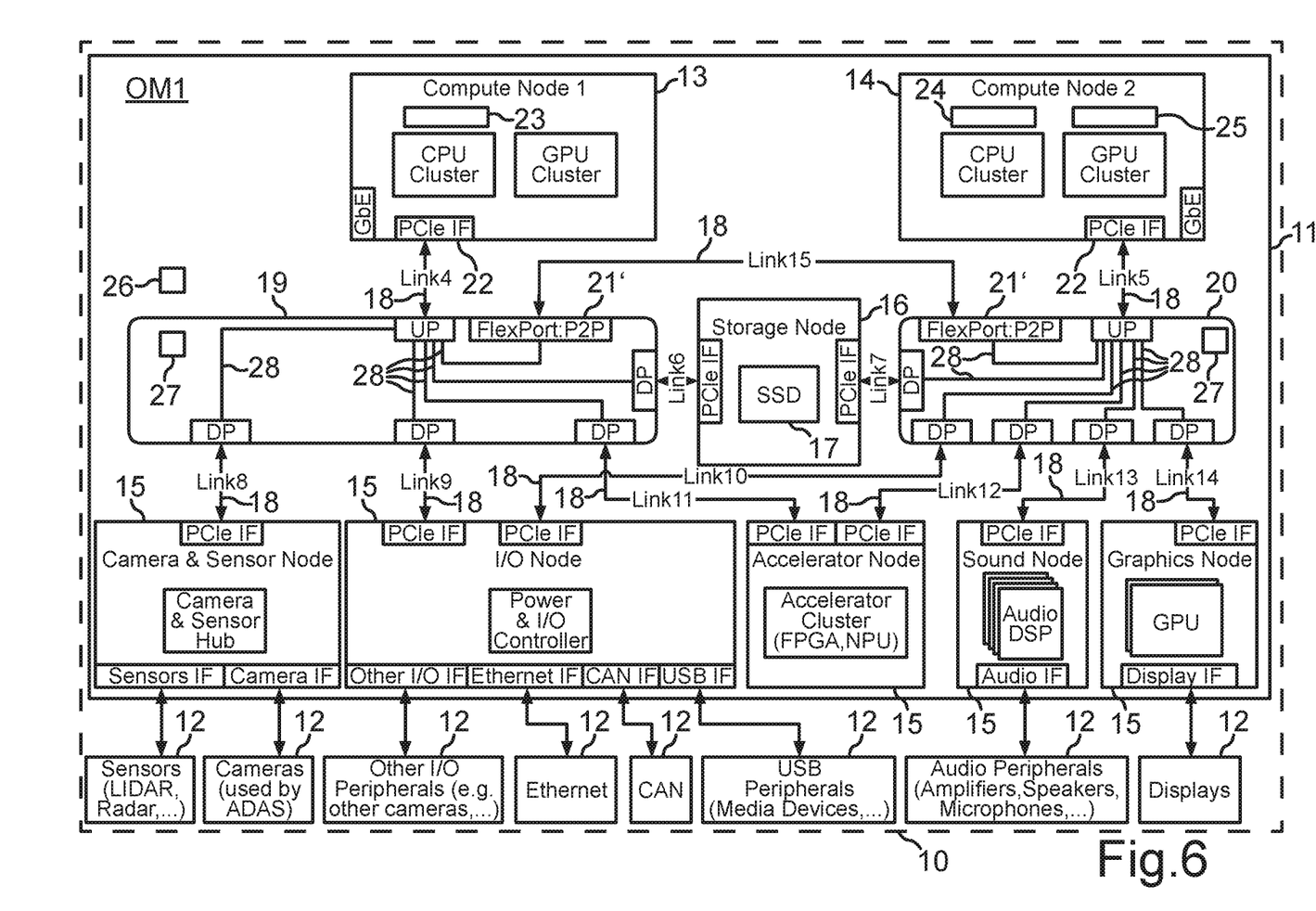
FIG. 6 is a schematic illustration of a control device of the motor vehicle of FIG. 5 in a first operating mode, in accordance with some embodiments.
Figure 7:
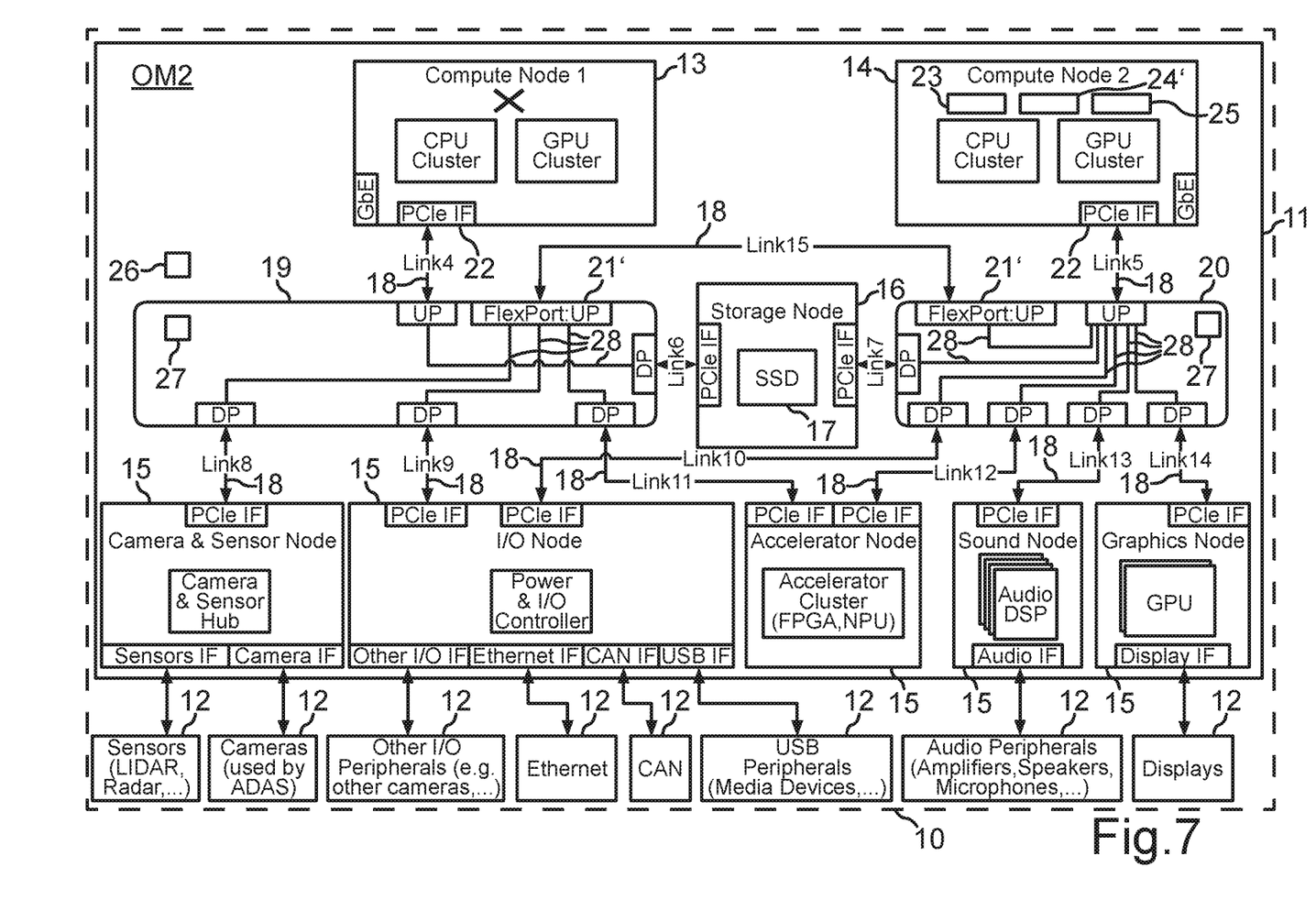
FIG. 7 is a schematic illustration of the control device of FIG. 6 in a second operating mode, in accordance with some embodiments.
Figure 8:
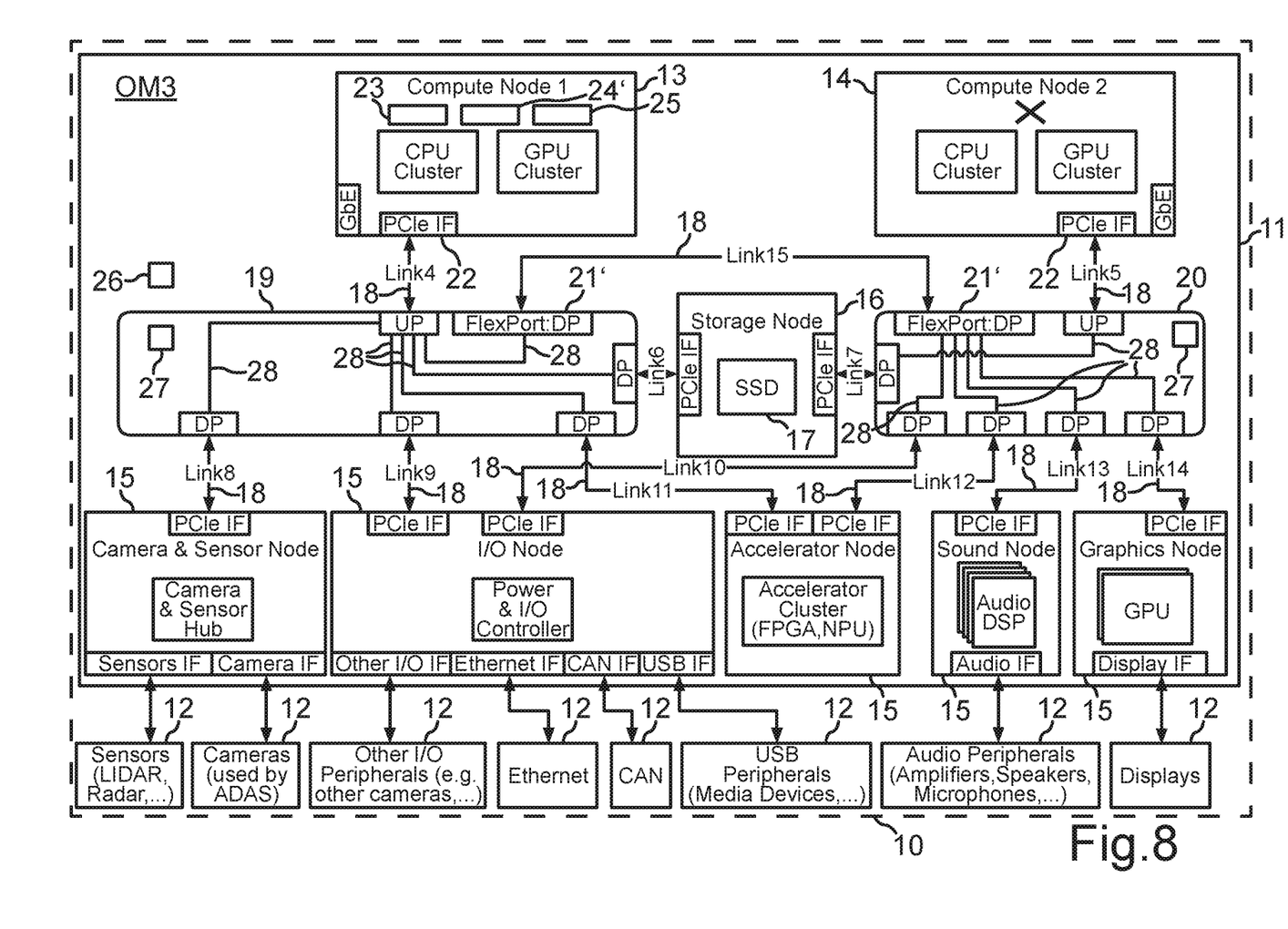
FIG. 8 is a schematic illustration of the control device of FIG. 6 in a third operating mode, in accordance with some embodiments.

FIG. 6 shows the configuration of the switching units 19, 20 for the first operating mode OM1. FIG. 7 shows the configuration of the switching units 19, 20 for the second operating mode OM2. FIG. 8 shows the configuration of the switching units 19, 20 for the third operating mode OM3.

Accordingly, the division of the computing power between the redundancy for the operating function 23 on the one hand and the auxiliary function 24 on the other hand requires fewer computing resources, namely only two processor units, than in the case that the redundancy would be provided by means of a third processing unit. This reduces costs, space requirements, weight and energy consumption.

The reallocation of the computing power between the operating function 23 and the auxiliary function 24 by means of the three operating modes OM1, OM2, OM3, can be used for a failure of one of the processor units or for a load balancing.

The generalized architecture for the operating function 23 and the auxiliary function 24 (that is, the symmetrical structure), simplifies the creation of operating functions and auxiliary functions and the development of appropriate software in which standardized methods may be used, as they may be used in telecommunications and on server farms. In addition, the illustrated architecture can be scaled by further processor units, that is to say expanded, by providing an associated switching unit with each processor unit.

The optimization, as described in connection with FIG. 5 to FIG. 8, yields further additional advantages, which are in particular the following.

The reduction in physical PCIe links between processor unit 13/switching unit 19 on the one hand and processor unit 14/switching unit 20 is reduced from three to one, resulting in the following savings, for example in terms of cost, space requirements and weight: two fewer communication lines, two fewer switch connection ports for both the first processor unit 13 and the second processor unit 14.

The reduction to a single Link15 is particularly important in the case illustrated in FIG. 9, in which the processor units 13, 14 are provided on different control units 11', as may be provided, for example, to increase operational safety or reliability. Here, the required cable C can be designed or manufactured with less cost and weight.

This solution requires only the described switchable ports which are referred to here as flex port.

Further optimizations can be made as follows.

1. PCIe is just a preferred type of connection, but it can also be replaced by connections such as InfiBand or an on-die-chip-2-chip link similar to CCIX or UPI-Link.

2. Another optimization would be the use of TSV (Through Silicon Vias) technology to directly attach the SSD memory shown on a system-on-chip (SoC) within each processor unit. Through this, each processor unit would then have its own SSD memory, which would be applied or arranged on the SoC.

3. Instead of a monitoring function 25, which is executed on the respective processor unit 13, 14, a third processor unit for executing the monitoring function 25 may be provided.

4. It can also be ensured that the operating function 23 always has complete redundancy, i.e. in each operating mode.

For this purpose, in addition to the first processor unit 13, a further processor unit may be provided, which is interconnected with the processor unit 13, for example with the switching unit 19. Then, alternately, the first processor unit 13 and this further processor unit could alternately execute the operating function 23 in order to restart the respective remaining processor unit in the described manner in a maintenance mode and/or to equip it with new software/firmware. For complete redundancy, the operating function 23 may then be executed simultaneously on the second processor unit 14 together with the reduced auxiliary function 24'. If the second processor unit 14 needs to be serviced, it may be executed as a reduced auxiliary function 24' on the first processor unit 13 or the further processor unit, along with the respective operating function 23 executed thereon.

Likewise, memory unit 16 may be duplicated to provide redundancy. The second memory unit may also have two PCI interfaces, thereby connecting them to the switching units 19, 20 in the manner shown in FIG. 1 for the switching unit 16.

The camera and sensor node shown, i.e. the peripheral unit 15 for connecting sensors and cameras, can also be designed in two ways. For example, in contrast to the peripheral unit 15 shown for cameras and sensors, it can be connected to the second switching unit 20, i.e., to the other switching unit as the first peripheral unit for the camera and sensors. This increases the reliability of the first operating function 23 in the case of an ADAS.

FIG. 9 further illustrates a solution in which each switching unit 19, 20 is implemented by a plurality of PCIe switches. So, several integrated circuits (ICs) are provided in each of the switching units 19, 20.

Generally, the illustrated control device 11 is not limited to use in a motor vehicle. It may also be provided for computing applications with a plurality of compute nodes or processor units, which generally provide redundancy for providing an operating function 23, with communication between the processor units and associated peripheral units being used by the operating function 23 being necessary.

Overall, the examples show how to provide a resource-efficient vehicle computer architecture.

The invention claimed is:

1. A control device for redundant execution of an operating function, the control device comprising:
    a first processor unit;
    a second processor unit;
    a plurality of peripheral units;
    a coupling device;
    a first switching unit; and
    a second switching unit,
    wherein the first processor unit is connected to at least one peripheral unit of the plurality of peripheral units via the first switching unit independently of the second switching unit,
    wherein the second processor unit is connected to the at least one peripheral unit via the second switching unit independently of the first switching unit,
    wherein the control device is configured to perform operations in a first operating mode, the operations comprising:
        executing, at the first processor unit, the operating function,
        coupling, via the first switching unit, the first processor unit with at least one peripheral unit used by the operating function,
        performing, at the second processor unit, an auxiliary function,
        coupling, via the second switching unit, the second processor unit with the at least one peripheral unit used by the auxiliary function,
    wherein the control device is further configured to perform other operations in a second operating mode, the other operations comprising:
        executing, at the second processor unit, the operating function,
        executing, at the second processor unit, the auxiliary function in a predefined reduced scope, wherein the predefined reduced scope is a reduction in a number of functionalities or features provided by the auxiliary function, and
    wherein the coupling device is configured to connect the second processor unit to the first switching unit and to couple the second processor unit to the at least one peripheral unit associated with the operating function via the first switching unit.

2. The control device of claim 1, wherein the first switching unit and/or the second switching unit is a PCI Express switching unit.

3. The control device of claim 1, further comprising:
    a communication line, and
    wherein the first switching unit further comprises:
        a connection port, the connection port configured to operate in an upward mode,
    wherein the connection port is connected to a switch connection interface of the second processor unit via the communication line.

4. The control device of claim 1, further comprising:
    a communication line, and
    wherein the coupling device is further configured to interconnect the first switching unit and the second switching unit directly via the communication line.

5. The control device of claim 4, wherein the communication line is connected to a connection port of the first switching unit and a connection port of the second switching unit, and
    wherein at least one of the connection port of the first switching unit and the connection port of the second switching is designed to be operable in at least one mode, the at least one mode comprising: an upward mode (UP), a downward mode (DP), and a non-transparent bridging (NTB) mode.

6. The control device of claim 4, wherein the first processor unit and the second processor unit are exclusively coupled indirectly via the communication line for data exchange.

7. The control device of claim 4, further comprising:
    a memory unit, and
    wherein the other operations further comprise:
        coupling the first processor unit to the memory unit via the first switching unit.

8. The control device of claim 1, further comprising:
    a plurality of control units,
    wherein the first processor unit and the second processor unit are arranged in different control units of the plurality of control units.

9. The control device of claim 1, wherein the control device is further configured to perform operations in a third operating mode, the operations in the third operating mode comprising:
    executing, at the first processor unit, the operating function; and
    executing, at the first processor unit, the auxiliary function in an other predefined reduced scope,
        wherein the other predefined reduced scope is an other reduction in a number of functionalities or features provided by the auxiliary function, and
        wherein the coupling device is further configured to connect the first processor unit to the second switching unit and to couple the first processor unit to the at least one peripheral unit associated with the operating function via the second switching unit.

10. The control device of claim 1, wherein the control device is further configured to check availability of the operating function in one of the first operating mode, the second operating mode, and a third operating mode via a monitoring function.

11. The control device of claim 10, further comprising a third processor unit, and wherein the control device is further configured to execute the monitoring function by the third processor unit, or the first processor unit and the second processor unit.

12. The control device of claim 1, wherein the first switching unit and the second switching unit each comprises at least one switching integrated circuit (IC).

13. The control device of claim 1, wherein the plurality of peripheral units comprise:
at least one coprocessor unit, at least one input/output unit, at least one sensor interface, a sensor device, at least one audio interface, at least one audio system, at least one graphics interface, and/or at least one display device.

14. The control device of claim 1, wherein the operating function is an advanced driver assistance system (ADAS) function of a motor vehicle and/or the auxiliary function is an infotainment function of the motor vehicle.

15. A motor vehicle comprising:
a control device, comprising:
a first processor unit;
a second processor unit;
a plurality of peripheral units;
a coupling device;
a first switching unit; and
a second switching unit,
wherein the first processor unit is connected to at least one peripheral unit of the plurality of peripheral units via the first switching unit independently of the second switching unit,
wherein the second processor unit is connected to the at least one peripheral unit via the second switching unit independently of the first switching unit,
wherein the control device is configured to perform operations in a first operating mode, the operations comprising:
executing, at the first processor unit, an operating function,
coupling, via the first switching unit, the first processor unit with at least one peripheral unit used by the operating function,
performing, at the second processor unit, an auxiliary function,
coupling, via the second switching unit, the second processor unit with the at least one peripheral unit used by the auxiliary function,
wherein the control device is further configured to perform other operations in a second operating mode, the other operations comprising:
executing, at the second processor unit, the operating function,
executing, at the second processor unit, the auxiliary function in a predefined reduced scope, wherein the predefined reduced scope is a reduction in a number of functionalities or features provided by the auxiliary function, and
wherein the coupling device is configured to connect the second processor unit to the first switching unit and to couple the second processor unit to the at least one peripheral unit associated with the operating function via the first switching unit.

16. The motor vehicle of claim 15, wherein the first switching unit and/or the second switching unit is a PCI Express switching unit.

17. The motor vehicle of claim 15, wherein the control device further comprises:
a plurality of control units,
wherein the first processor unit and the second processor unit are arranged in different control units of the plurality of control units.

18. The motor vehicle of claim 15, wherein the first switching unit and the second switching unit each comprises at least one switching integrated circuit (IC).

19. The motor vehicle of claim 15, wherein the plurality of peripheral units comprise: at least one coprocessor unit, at least one input/output unit, at least one sensor interface, a sensor device, at least one audio interface, at least one audio system, at least one graphics interface, and/or at least one display device.

20. The motor vehicle of claim 15, wherein the operating function is an advanced driver assistance system (ADAS) function of the motor vehicle and/or the auxiliary function is an infotainment function of the motor vehicle.

* * * * *